May 11, 1926.

T. ARIMITSU

QUADRANT

Filed March 31, 1919

1,583,950

Inventor
T. Arimitsu.

By H. R. Kerslake
Atty.

Patented May 11, 1926.

1,583,950

UNITED STATES PATENT OFFICE.

TOSHIICHI ARIMITSU, OF YOKOHAMA, JAPAN, ASSIGNOR TO NIPPON YUSEN CO. LTD., OF TOKYO, JAPAN.

QUADRANT.

Application filed March 31, 1919. Serial No. 286,402.

This invention relates to improvements in apparatus for use in mechanically solving nautical problems or plane and spherical trigonometry, and the invention has for its object to provide apparatus of this character by which problems in plane or spherical trigonometry may be mechanically solved with simplicity and accuracy without the use of logarithmic calculations, and which may also be used in connection with astronomical navigation whereby a ship's position, distances between places, and bearings or azimuth may be easily solved.

With these and other objects in view the invention consists of certain novel features of construction which will be hereinafter more fully described and claimed, reference being had to the accompanying drawing, in which:

Figure 1:
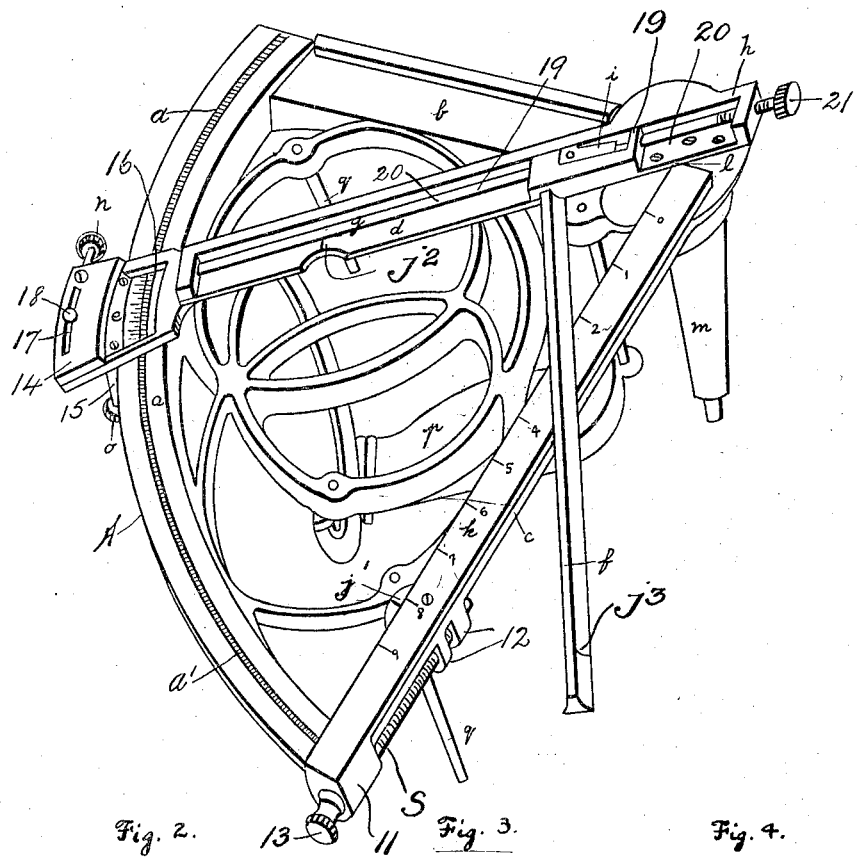
Fig. 1 is a perspective view of the apparatus.
Figure 2:
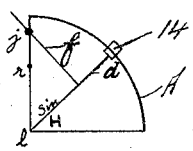
Figs. 2, 3 and 4 show the invention applied to use.
Figure 3:
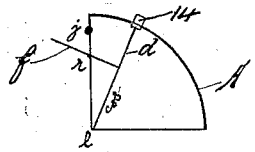
Figure 4:
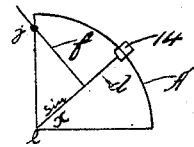

Referring to the drawing in detail $a$ designates an arc connected with arms $b$ and $c$ which form the main body of a quadrant A, the members $a$, $b$ and $c$ being so arranged as to present an absolute plane on its surface. The arc $a$ is provided with angular graduations $a'$ for practical uses.

An index bar $d$ is fitted on the quadrant so as to slide on the surface thereof and is pivotally mounted at the center of the arc, the angle of the index bar being measured on the graduations $a'$ of the arc with reference to the vernier 14 on the extremity of the index bar.

A "pointer" $f$ is fitted on the index bar $d$ and is so arranged as to travel on the surface of the quadrant at right angles to the index bar. The pointer $f$ is provided with an enlarged extremity 19 which is mounted to slide upon a shaft $g$ fitted in a guideway 20 provided in the index bar $d$. A friction spring $i$ carried by the extremity of the pointer has frictional engagement with the shaft $g$ whereby the pointer is retained in adjusted position against accidental displacement. One extremity of the shaft $g$ is swivelly mounted in the end of the index bar $d$ adjacent the vernier 14 whereas the opposite extremity of said shaft is screw threaded and fitted in a correspondingly threaded portion of the pivoted extremity of the index bar, a thumb nut 21 being provided at the threaded extremity of the shaft to facilitate adjustment thereof.

When it is desired to move the pointer $f$ on a large scale, the pointer can be slid along the shaft $g$ by hand against the resistance offered by the pressure of the spring $i$ upon the shaft $g$ while if only a small movement of the pointer is required the nut 21 of the shaft may be turned, thereby moving the shaft and pointer forwardly or backwardly, according to the direction in which the shaft is rotated, the spring $i$ acting to maintain the pointer $f$ in position upon the shaft and to cause simultaneous movement thereof.

At $j^1$ is provided a boss having an index line inscribed thereon, said boss being slidable on the arm $c$ and adjustable with respect to said arm by means of the screw $s$. This screw $s$ is rotatably mounted in a bearing 11 provided on the arm $c$ and coacts with lugs 12 supporting the boss $j^1$. On the bar $d$ is a similar index point $j^2$, while on the bar $f$ is a third index $j^3$. The index point $j^2$ is arranged to coincide with the index point $j^1$ whenever the arm $d$ is swung into engagement with the arm $c$, and similarly the index point $j^3$ is of such distance from the center line of the bar $d$ that this distance will equal the distance from $l$ to the index point $j^1$.

The index bar $d$ is provided with a clamping screw $o$, and a tangent screw $n$ by means of which latter the vernier $e$ may be accurately adjusted on the graduation of the arc $a$, these parts being the same as those in the usual sextant.

It will be understood that all measurements of trigonometrical functions of angles read on the graduated arc $a$, are themselves read on the graduated scale $k$. Examples will now be given of the manner in which these trigonometrical functions can be read.

For instance, let it be supposed that we desire to determine the sine of the angle A. To do this we set the bar $d$ to read the angle A from the $b$ end of the graduated arc $a$. We then move the bar $f$ by means of its slider and the screw 21 until the edge of the bar $f$ coincides with the index point $j^1$. We then release the bar $d$ and swing it until it is brought into contact with the bar $c$ whereupon the distance from the point $l$ to the edge of the bar $f$ as read on the graduated scale $k$ will indicate the sine of the angle. In obtaining the cosine of the same angle, the same procedure is followed with the exception that the angle is read from the *c* end of the graduated arc *a*. Since this graduated arc *a* is graduated for 90° it will be obvious that this will be true since the cosine of *a* equals the sine of 90° minus *a*.

In order to obtain the secant of A, the bar *d* is set for the angle A, from the *c* end of the graduated arc *a*. The bar *f* is then brought into alinement with the index point $j^2$ and there fixed. Then the secant may be read directly on the scale *k*. It will be obvious that a given co-secant can be obtained in like manner by setting the angle A from the *b* end of the graduated arc *a*.

In order to obtain the tangent of the angle A, the bar *d* is set for the angle A on the graduated arc *a*, measuring from the *b* end of said arc. The arm *f* is then slid along the arm *d* until the index $j^3$ coincides with the edge of the graduated scale *k*, whereupon the reading of that scale from the end *l* will give the tangent of the angle A. The cotangent is obtained in like manner measuring from the *c* end of the graduated arc *a*.

In order to multiply a given value by a trigonometrical function, as for instance by sin A, the following procedure is adopted:

The arm *d* is moved to measure the angle A from the *b* end. The arm *f* is then moved to coincide on the scale *k* with the given value. The arm *d* is then swung against the arm *c* and the reading on *k* to the edge of the arm *f* will be the required product. The multiplication of the cosine will be obvious from the above.

In multiplying by the secant, the arm *d* is brought into engagement with the arm *c*, and the arm *f* moved to cut the given value on the scale *k*. The arm *d* is then swung to measure angle A on the graduated arc *a* from the *c* end and the reading is taken on the scale *k*. The cosecant is used as a multiplier in the same way, but laying off the angle from the *b* end of the graduated arc *a*.

In order to multiply by the tangent it is first necessary to multiply the given value by the secant as just described. The value thus obtained is then multiplied by the sine of the angle, and the final value as read on the scale *k* will be the product required.

In multiplying by the cot A, the given value is first multiplied by the cosec A, and the product then multiplied by cos A, as previously described.

As an example of the manner in which an angle may be read for a given value of a trigonometrical function, the reading of A may be obtained from sin A in the following manner:

Bring the arm *d* against the arm *c* and move the arm *f* to read sin A on the scale *k*. Swing the arm *d* until the edge of the arm *f* coincides with the index point $j^1$, and read the angle on the scale of the graduated arc *a*. For other values similar operations may be performed.

In order to multiply two trigonometrical functions together, as for instance, to solve such a problem as to obtain the angle C in the formula sin A cos B = sin C, the following procedure is adopted.

Obtain the value of sin A as previously described, and note the position of the arm *f* on the scale *k*. Use this as a given numerical value and multiply by cos B as previously described. By this procedure there may be read on the scale *k* the product sin A cos B, and the value of C may be found from this product in the manner previously described by swinging the arm *d* until the edge of arm *f* coincides with the index point of $j^1$.

I claim—

1. In an apparatus of the character described, a quadrant consisting of angularly disposed arms and a graduated arc connecting said arms, an index arm pivoted at the center of the quadrant and movable over the arc thereof, a vernier carried adjacent the arc engaging end of the index arm and associated with the graduations of said arc for indicating the angle of the index arm, a graduated index slidable on one of the arms of said quadrant, said last mentioned arm having a point of unit indication associated therewith, means for adjusting the slidable index with respect to said arm, and a pointer carried by and movable longitudinally of said index arm and disposed in fixed angular relation with respect thereto, said pointer being movable over the slidable index.

2. In an apparatus of the character described, a quadrant consisting of angularly disposed arms and a graduated arc connecting said arms, an index arm pivoted at the center of the quadrant and movable over the arc thereof, a vernier carried adjacent the arc engaging end of the index arm and associated with the graduations of said arc for indicating the angle of the index arm, a graduated index slidable on one of the arms of said quadrant, said last mentioned arm having a point of unit indication associated therewith, means for adjusting the slidable index with respect to said arm, a pointer disposed in angular relation to the index arm, means connecting the pointer with the index arm and permitting adjustment of the pointer with respect to the arm, said pointer being movable over the graduations of the slidable index, and means for adjusting the connecting means with respect to the arm for affecting minor adjustment of the pointer.

3. In an apparatus of the character described, a quadrant consisting of angularly disposed arms and a graduated arc connected with said arms, an index arm pivoted at the center of the quadrant and movable over the arc thereof, a vernier carried adjacent the outer end of the index arm and associated with the graduations on the arc, a graduated index slidable on one of the arms of said quadrant, said last mentioned arm having a point of unit indication associated therewith, a pointer disposed angularly with respect to the index arm and movable over the slidable index, a shaft carried by the index arm slidably supporting the pointer and maintaining the latter in fixed angular relation to the index arm, and means for moving said shaft longitudinally with respect to said arm whereby to effect minor adjustments of the pointer.

In testimony whereof he affixes his signature.

TOSHIICHI ARIMITSU. [L. S.]